US012730658B2

(12) United States Patent
Dengler et al.

(10) Patent No.: US 12,730,658 B2
(45) **Date of Patent: *Sep. 8, 2026**

(54) METHODS AND SYSTEMS FOR ANALYZING AND PRESENTING EVENT INFORMATION

(71) Applicant: SportsMEDIA Technology Corporation, Durham, NC (US)

(72) Inventors: John D. Dengler, Durham, NC (US); Gerard J. Hall, Durham, NC (US)

(73) Assignee: SportsMEDIA Technology Corporation, Durham, NC (US)

( * ) Notice: Subject to any disclaimer, the term of this patent is extended or adjusted under 35 U.S.C. 154(b) by 212 days.

This patent is subject to a terminal disclaimer.

(21) Appl. No.: 18/798,299

(22) Filed: Aug. 8, 2024

(65) Prior Publication Data

US 2024/0394074 A1 Nov. 28, 2024

Related U.S. Application Data

(63) Continuation of application No. 18/486,711, filed on Oct. 13, 2023, now Pat. No. 12,086,617, which is a continuation of application No. 18/085,126, filed on Dec. 20, 2022, now Pat. No. 11,789,757, which is a continuation of application No. 17/082,754, filed on Oct. 28, 2020, now Pat. No. 11,544,084, which is a continuation-in-part of application No. 15/923,203, (Continued)

(51) Int. Cl.

| | |
|---|---|
| ***G06T 19/20*** | (2011.01) |
| ***G06F 9/451*** | (2018.01) |
| *G06T 19/00* | (2011.01) |

(52) U.S. Cl.

CPC .............. *G06F 9/451* (2018.02); *G06T 19/20* (2013.01); *G06T 19/006* (2013.01); *G06T 2207/30221* (2013.01); *G06T 2207/30228* (2013.01)

(58) Field of Classification Search

CPC .......... G06T 15/20; G06T 7/97; G06T 7/246; G06T 2207/10016; G06T 2207/30221; G06T 2207/30024; G06T 2207/30228; G06T 2207/30241; H04N 5/272; H04N 5/2723; H04L 65/60; H04L 29/06; G06F 3/04842; G06F 3/0482

USPC .................................. 715/719; 345/632, 633

See application file for complete search history.

(56) References Cited

U.S. PATENT DOCUMENTS

| | | | |
|---|---|---|---|
| 6,379,156 | B1 | 4/2002 | Laravea et al. |
| 8,702,504 | B1 | 4/2014 | Hughes et al. |

(Continued)

*Primary Examiner* — Rinna Yi

(74) *Attorney, Agent, or Firm* — Neo IP

(57) ABSTRACT

Methods, systems, graphical user interfaces (GUIs), and computer-readable media for presenting GUI elements generated based on information associated with an event are generally described. An event information presentation system may be configured to present GUI elements generated based on substantially real-time event information associated with a live event, such as a sporting event. Illustrative event information may include object movement and location information for objects such as event participants (for instance, players) and articles (for instance, a football for a football game event). The event information may be interpreted based on activity categories to automatically differentiate, organize, highlight, or the like the event information in order to generate relevant and meaningful GUI elements.

20 Claims, 5 Drawing Sheets

Related U.S. Application Data filed on Mar. 16, 2018, now Pat. No. 10,824,444, which is a continuation of application No. 14/962, 704, filed on Dec. 8, 2015, now abandoned.

(60) Provisional application No. 62/089,123, filed on Dec. 8, 2014.

(56) References Cited

U.S. PATENT DOCUMENTS

| | | | | |
|---|---|---|---|---|
| 10,445,440 | B2 | 10/2019 | Kwon et al. | |
| 2002/0092027 | A1 | 7/2002 | Katayama | |
| 2006/0246973 | A1 | 11/2006 | Thomas et al. | |
| 2008/0291272 | A1 | 11/2008 | Krahnstoever et al. | |
| 2011/0013087 | A1* | 1/2011 | House | H04N 21/43072 348/E5.099 |
| 2011/0294580 | A1* | 12/2011 | Nakamura | A63F 13/58 463/42 |
| 2012/0071219 | A1 | 3/2012 | Belmarch et al. | |
| 2013/0079130 | A1 | 3/2013 | Takacs | |
| 2014/0364201 | A1 | 12/2014 | Tanibuchi | |
| 2015/0131845 | A1 | 5/2015 | Forouhar et al. | |
| 2015/0149837 | A1 | 5/2015 | Alonso et al. | |
| 2015/0248917 | A1 | 9/2015 | Chang et al. | |
| 2015/0382076 | A1 | 12/2015 | Davisson et al. | |
| 2017/0291093 | A1 | 10/2017 | Janssen | |
| 2018/0203712 | A1 | 7/2018 | Dengler et al. | |
| 2019/0361765 | A1* | 11/2019 | Alonso | H04W 4/029 |
| 2021/0073010 | A1 | 3/2021 | Dengler et al. | |
| 2023/0117495 | A1 | 4/2023 | Dengler et al. | |
| 2024/0061692 | A1 | 2/2024 | Dengler et al. | |

* cited by examiner

METHODS AND SYSTEMS FOR ANALYZING AND PRESENTING EVENT INFORMATION

CROSS-REFERENCE TO RELATED APPLICATIONS

This application is related to and claims priority from the following U.S. patent applications. This application is a continuation of U.S. patent application Ser. No. 18/486,711, filed Oct. 13, 2023, which is a continuation of U.S. patent application Ser. No. 18/085,126, filed Dec. 20, 2022 and issued as U.S. Pat. No. 11,789,757, which is a continuation of U.S. patent application Ser. No. 15/923,203, filed Mar. 16, 2018 and issued as U.S. Pat. No. 11,544,084, which is a continuation-in-part of U.S. patent application Ser. No. 15/923,203, filed Mar. 16, 2018 and issued as U.S. Pat. No. 10,824,444, which is a continuation of U.S. patent application Ser. No. 14/962,704, filed Dec. 8, 2015, which claims priority to U.S. Provisional Patent Application No. 62/089,123, filed Dec. 8, 2014, each of which is incorporated herein by reference in its entirety.

BACKGROUND OF THE INVENTION

Information and statistics associated with sporting events have become an integral part of the user entertainment experience. The popularity of supplementary activities and modes for interacting with sporting events, such as fantasy sports and monitoring sporting events on mobile devices, has increased the general public's expectations for meaningful, instantaneous information and statistics. In addition to conventional techniques for manually generating statistics, tracking systems have been configured to track objects and participants of live sporting events. For example, such tracking systems may be configured to provide tracking of one or more objects, people, landmarks, and/or the like and to generate a large amount of data relating to the tracking. The tracking systems may be used to monitor and receive information relating to various aspects of a sporting event or other live event, such as players, game officials, a ball/puck, and/or to generate data relating to the actions of the various players, game officials, balls/pucks, and other objects. This tracking data may be provided to one or more data consumers, such as viewers, commentators, producers, coaches, players, and/or the like.

The volume of tracking information generated from a sporting event may be expansive enough that a viewer or other data consumer cannot mentally process and/or efficiently use the data in a reasonable time after receiving it. For example, a television commentator may receive the data regarding the live sporting event, process a relatively small portion of the data, and present certain aspects of the data to an audience during a broadcast of the sporting event. However, commentators may not be able to process all of the data because the commentator may not have sufficient time to mentally process the data and distill relevant parts for the audience, particularly in sporting events containing fast-paced action. As such, valuable, insightful information will conventionally not be available to viewers, because the data consumer cannot process and present all of the accessible information in a timely manner. Accordingly, information processing and/or content providers may benefit from systems and methods configured to allow for the efficient and comprehensible presentation of data generated from a live event in substantially real-time.

SUMMARY OF THE INVENTION

Figure 1:
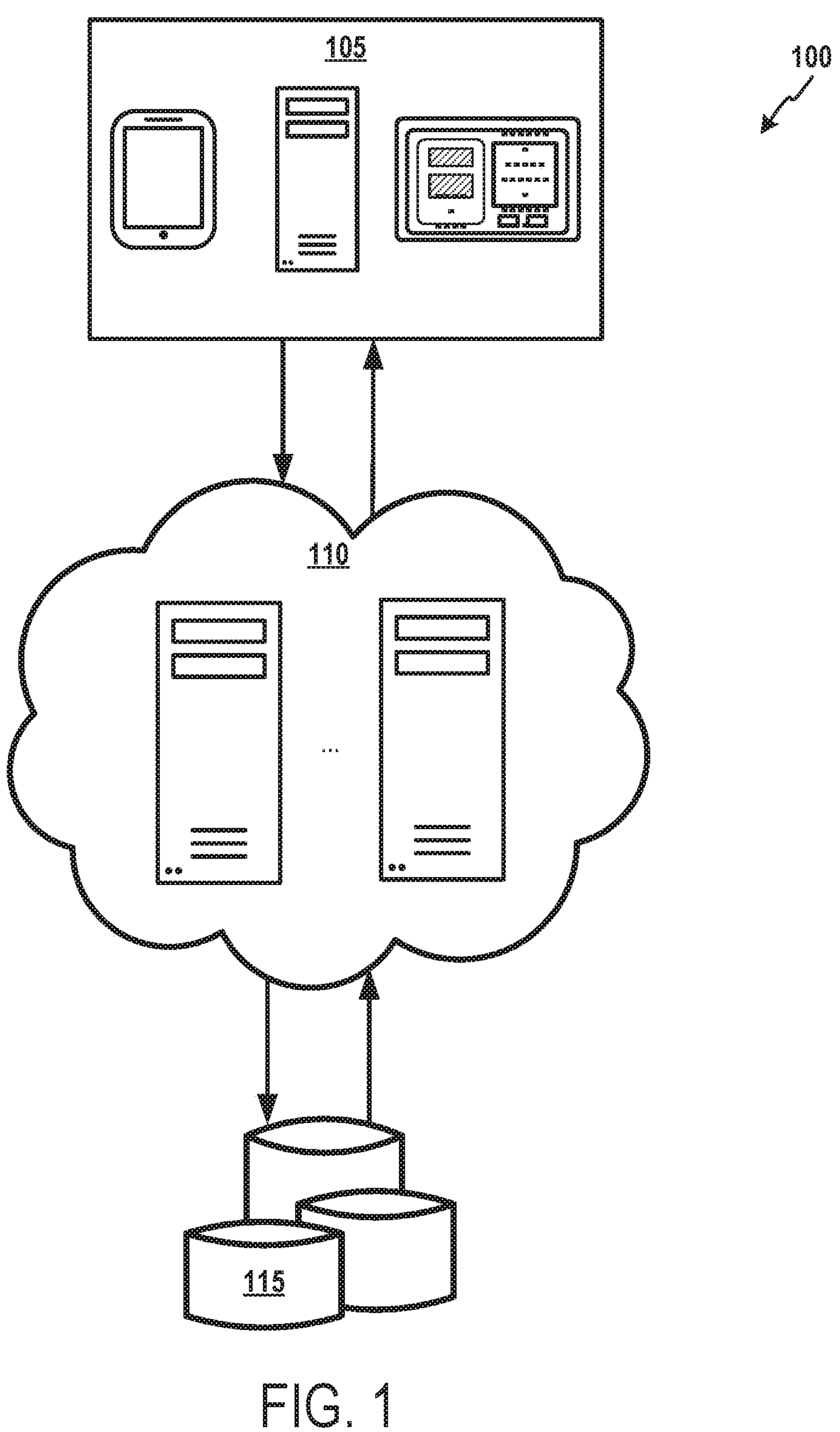
FIG. 1 depicts an illustrative event information presentation system according to a first embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, an event object information presentation system includes a processor and a non-transitory, computer-readable storage medium in operable communication with the processor. The computer-readable storage medium may contain one or more programming instructions that, when executed, cause the processor to receive event information associated with at least one event object during a live event, the event object information comprising location information and motion information, receive event-specific information providing rules for processing the event information, determine relevant event information based on the event-specific information, transform the relevant event information into at least one graphical user interface element based on the event-specific information, and, cause the at least one graphical user interface element to be presented on at least one content presentation device. The event object information presentation system is operable to utilize the event object information to automatically differentiate, organize, and highlight objects including the at least one event object and object tracking data for the user. This information is presentable in a manner which improves the viewer's experience.

In an embodiment, a computer-implemented method for presenting event object information, may include, by a processor: receiving event information associated with at least one event object during a live event, the event object information comprising location information and motion information, receiving event-specific information providing rules for processing the event information, determine relevant event information based on the event-specific information, transforming the relevant event information into at least one graphical user interface element based on the event-specific information, and causing the at least one graphical user interface element to be presented on at least one content presentation device. The event object information presentation system received by the processor is operable to utilize the event object information to automatically differentiate, organize, and highlight objects including the at least one event object and object tracking data for the user.

This information is presentable on the at least one graphical user interface in a manner which improves the viewer's experience.

In an embodiment, a graphical user interface for presenting event information associated with a live event may include at least one graphical user interface element overlaid on a video presentation of a live event, the at least one graphical user interface element being associated with an object of the live event, and relevant event information presented on the at least one graphical user interface, the relevant event information being determined based on event-specific information providing rules for processing the event information, the relevant information being updated in substantially real-time.

In an embodiment, a method for displaying object location and motion information of a sporting event may include an object tracking process configured to track sport-related objects in space (for instance, in relation to a playing surface). In some embodiments, an event information presentation system may use the objects and object tracking data may be used to generate graphical user interface (GUI) objects that may be displayed on a content presentation device. In some embodiments, the event information presentation system may use parameters, attributes, and/or metrics to automatically differentiate, organize, and highlight the objects and object tracking data for a viewer. In some embodiments, the parameters, attributes, and/or metrics may be derived from location, velocity, acceleration, and/or directional information related to tracked objects. In some embodiments, the parameters, attributes and metrics may be derived from historical information, such as historical location, velocity, acceleration, and/or directional information related to tracked objects. In some embodiments, the parameters, attributes, and/or metrics may be derived based on relationships between tracked objects and an event-specific scoring system. For instance, the parameters, attributes, and/or metrics may be derived based on relationships between tracked objects, biographical and/or roster position (for instance, quarterback, running back, or the like), and information provided by a sport-specific scoring system. In an embodiment, a method for calculating the probability of success for a sporting event activity may include an activity categorization process configured to determine a category of the sporting event activity, an activity outcome calculation process configured to calculate a degree of success for the sporting event activity, an activity recording process configured to store a history of sporting event activities and each sporting event activity's category and outcome, and calculating a probability of success based on a previous outcome history for the category of the sporting event activity.

In another embodiment, the present invention is directed to a system for event information presentation, including a processor and a non-transitory computer-readable storage medium in communication with the processor, wherein the non-transitory computer-readable storage medium contains one or more programming instructions, wherein the processor is operable to: receive event object information associated with live event objects during the live event, the event object information comprising location information and motion information; receive event-specific rules for processing the event object information, wherein the event-specific rules provide an event-specific framework for relevant rule processing for the live event; determine and extract event information from the event object information based on the event-specific rules; utilize the event object information to automatically differentiate the live event objects; generate graphical elements associated with the live event objects based on the event object information; and populate a GUI with the graphical elements associated with the live event objects; wherein the GUI includes a first display portion including a digital representation of a venue associated with the live event and a second display portion including a roster of the live event objects; wherein the graphical elements associated with the live event objects include at least one first set of graphical elements and at least one second set of graphical elements; and wherein the first set of graphical elements is represented on the first display portion and the second display portion using a different color or a different shape than the second set of graphical elements. In another embodiment, the present invention is directed to a method for event information presentation, including receiving event object information associated with live event objects during a live event, the event object information comprising location information and motion information; receiving event-specific rules for processing the event object information, wherein the event-specific rules provide an event-specific framework for relevant rule processing for the live event; determining and extracting event information from the event object information based on the event-specific rules; utilizing the event object information to automatically differentiate the live event objects; generating graphical elements associated with the live event objects based on the event object information; and populating a GUI with the graphical elements associated with the live event objects; wherein the GUI includes a first display portion including a digital representation of a venue associated with the live event and a second display portion including a roster of the live event objects; wherein the graphical elements associated with the live event objects include at least one first set of graphical elements and at least one second set of graphical elements; and wherein the first set of graphical elements is represented on the first display portion and the second display portion using a different color or a different shape than the second set of graphical elements. In yet another embodiment, the present invention is directed to a system for event information presentation, including a processor and a non-transitory computer-readable storage medium in communication with the processor, wherein the non-transitory computer-readable storage medium contains one or more programming instructions, wherein the processor is operable to: receive event object information associated with live event objects during the live event, the event object information comprising location information and motion information; utilize the event object information to automatically differentiate the live event objects; generate graphical elements associated with the live event objects based on the event object information; and populate a GUI with the graphical elements associated with the live event objects; wherein the GUI includes a first display portion including a digital representation of a venue associated with the live event and a second display portion including a roster of the live event objects; wherein the graphical elements associated with the live event objects include at least one first set of graphical elements and at least one second set of graphical elements; and wherein the first set of graphical elements further comprises a first subset of the first graphical elements and a second subset of the first graphical elements, wherein the second set of graphical elements further comprises a first subset of the second graphical elements and a second subset of the second graphical elements, wherein the first subset of the first graphical elements represents a first roster position on a first team, wherein the second subset of the first graphical elements represents a second roster position on the first team, wherein the first subset of the second graphical elements represents a first roster position on a second team, and wherein the second subset of the second graphical elements represents a second roster position on the second team; and wherein the first subset of the first graphical elements, the second subset of the first graphical elements, the first subset of the second graphical elements, and the second subset of the second graphical elements is each represented using different shapes or colors on the first display portion and the second display portion.

DETAILED DESCRIPTION

The described technology generally relates to systems, methods, and non-transitory computer-readable media for presenting graphical user interface (GUI) elements generated based on information associated with an event. In some embodiments, an event information presentation system (the "presentation system") may be configured to present GUI elements generated based on substantially real-time event information associated with a live event, such as a sporting event. For instance, the event information may include object information associated with at least one event object, such as a participant or event object (for example, a football) of the sporting event. In some embodiments, the object information may include location and movement information of the participant. In some embodiments, the event information may include information pertaining to the event, such as weather conditions, event date and time, geographic information (for instance, global positioning system (GPS) information), event conditions (for instance, field or track conditions), or the like. The GUI elements may be configured to graphically present the location and movement information of the participant in real-time or substantially real time. For instance, for a football game event, the GUI elements may include an element configured to display the running speed, rushing yards, and yards-per-carry of a running back during a rushing play.

In some embodiments, the GUI elements may be generated based on historical information. In some embodiments, the GUI elements may be generated based on a combination of historical information and substantially real-time information. In some embodiments, the GUI elements may be configured to provide a probability of success of a current or future event activity based on historical information and/or substantially real-time information.

In some embodiments, the event information may be processed based on the type of event in order to generate GUI elements that are relevant and meaningful for the particular event. In general, a relevant and meaningful GUI element is a GUI element that is of interest to a user interacting with the event, for example, while viewing the event on television and/or following a web-based or mobile app-based version on a computing device. The event information generated for an event may include a large amount of information, some of which will not be of interest to the user. The presentation system may be configured to process the event information to determine which information is of interest and to generate GUI elements based on the information of interest. For instance, each type of event may be associated with one or more event activity categories. For a football game event, the activity categories may include passing, tackling, rushing, or the like. For a baseball game event, the activity categories may include, pitching, hitting, fielding, or the like. In some embodiments, one or more event categories may be associated with a particular participant. For instance, a running back on a football team may be associated with a rushing activity category. In another instance, a first baseman on a baseball team may be associated with a fielding activity category and a hitting activity category.

In some embodiments, the event information may be interpreted based on the activity categories to automatically differentiate, organize, highlight, or the like the event information in order to generate relevant and meaningful GUI elements. For example, the event information may receive motion and location information for a first player of a football team during a football game event. The event information may include location or geographic coordinate information for the playing field. In this manner, location information received by the presentation system that is associated with a player (for example, GPS information or relative location information) may be used by the presentation system to determine where the first player is on the field. The event information may indicate that the first player is a running back of a team on offense and that a play has been initiated (for instance, based on ball movement and/or which player possesses the ball, such as the quarterback, the center, or the like). The event information may include the position of the ball and the position of the first player, as well as the other players on the field, such that the event information may indicate that the player has the ball. In another example, the ball position information and the location and movement information relating to the first player may indicate that another player (for example, the quarterback) has the ball and the first player is running a route (for example, running beyond the line of scrimmage without the ball), blocking another player (for example, in close proximity to a defensive player and without the ball), or the like. In some embodiments, one or more GUI elements may be generated to graphically represent the activity of the first player during the game and/or portions thereof. For example, a commentator may provide input requesting that all plays in which the first player touched the football be graphically presented on a content presentation device depicting, for example, the yards gained by the first player and running routes displayed over a graphical depiction of the football field. In another example, the presentation system may receive information for example, through an application, mobile application, or the like, players that are members of the user's fantasy football team. The presentation system may be configured to generate GUI elements that may be displayed on a content presentation device, such as a television or a mobile device, that provide relevant and meaningful GUI elements for assessing and/or predicting the performance of the user's fantasy football team.

The system configured according to some embodiments described herein provides multiple technological advantages and technical features. One non-limiting technological advantage and technical feature is the efficient capture of event information and the real-time or substantially real-time analysis of this information to provide effective and efficient presentation of relevant and meaningful GUI elements to viewers. Another non-limiting technological advantage and technical feature is efficient and effective organization and differentiation of the large volume of event information generated during an event particularized based on the type of event and/or object associated with the event information.

The system provides multiple technological advances over and provides multiple technical features not present in conventional systems, including conventional computer-based systems and paper-based systems. Paper-based systems, such as the use of conventional statistics books, paper charting techniques, or the like are not capable of providing a GUI for presenting meaningful GUI elements related to an event or event object nor to accurately and quickly generate event activity predictions. Conventional computer-based systems suffer from much of the same deficiencies as paper-based systems, except that an information consumer (for instance, a commentator, a content provider, a producer, a coach (for example, to make a game-time decision), or the like) is interacting with a computer screen instead of paper-based databases and charts. Although a computer is able to locate and process information much faster, such conventional computer-based systems are not configured to present the information in an efficient, meaningful way that provides a markedly improved user experience and/or that assists viewers or data consumers with making faster and more accurate decisions. Conventional computer-based systems require data consumers to go through volumes of data and myriad tedious drop-down selections, pages, and search queries in order to access information. Conventional computer-based systems are able to present information faster, however, they are not able to present meaningful information that assists viewers and data consumers with efficiently sharing information, achieving an improved user experience, and/or making quick and accurate decisions.

In contrast, the methods and systems described according to some embodiments reduce or even eliminate the time and cognitive effort required for viewers and data consumers to access, quantify, and assess event information. For example, a television producer is better able to make efficient and accurate decisions about which event information to present, and how to present it, to viewers as the presentation system may be configured to automatically generate GUI elements that are relevant and meaningful to the event. In another example, a television commentator may be able to provide an improved user experience by interacting with GUI elements configured to efficiently and effectively present relevant and meaningful event information. In addition, the presentation system may be configured to transform event information into a format that is easily accessible and understandable to viewers and data consumers. For instance, the system may be configured to transform event information into predictions, probabilities, or the like that may be of interest to viewers and/or useful to data consumers (for example, coaches or players in a sporting event, campaign strategist, financial advisor, poker player during a tournament, or the like).

The system presents novel software tools and user interfaces that solve technical problems relating to providing event information to viewers and data consumers, particularly in the real-time environment of broadcasting a live event or participating in a competition. In this manner, the presentation system may transform event information into graphical interface objects and/or characteristics thereof that may be used to allow viewers to have an improved user experience and for data consumers to more efficiently, effectively, and accurately make decisions based on event information, especially in time-sensitive event situations, than is possible using conventional techniques and processes.

The following terms shall have, for the purposes of this application, the respective meanings set forth below.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices may include, without limitation, computing devices, gaming systems, televisions, mobile devices, medical devices, telescopes, satellites, recording devices, automatic teller machines, kiosks, electronic locks, and/or the like.

A "mobile device" refers to an electronic device that is generally portable in size and nature, or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches ("smart watches"), and the like.

A "computing device" is an electronic device, such as a computer, a processor, a memory, and/or any other component, device or system that performs one or more operations according to one or more programming instructions.

A "content presentation device" may generally refer to any device that is capable of presenting content to a viewer or other type of content consumer. In some embodiments, a computing device may be configured as a content presentation device. Non-limiting examples of content presentation devices include televisions, smart televisions, laptops, personal digital assistants (PDAs), tablet computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top boxes, satellite receivers, video-on-demand (VOD) receivers, content receivers (e.g., Apple TV® manufactured by Apple Inc. of Cupertino, California, United States; Roku® manufactured by Roku, Inc. of Saratoga, California, United States), digital video recorders (DVRs), personal video recorders (PVRs), hard drives, flash drives, storage servers, digital video disc (DVD) devices, Blu-ray™ devices, or the like. A recipient, viewer, audience member, or the like may generally include an individual viewing, watching, listening to, consuming, recording, streaming, or otherwise interacting with content using a content presentation device.

A "user interface" or "graphical user interface" (GUI) is an interface which allows a user to view and/or interact with a computer, computer system, or other content presentation device. The GUI may also be referred to as a "human interface." A GUI may generally provide information or data to the user and/or receive information or data from the user. The GUI may enable input from a user to be received by the content presentation device and may provide output to the user from the content presentation device. Accordingly, the GUI may allow a user to control or manipulate a content presentation device and may allow the computer to indicate the effects of the user's control or manipulation. The display of data or information on a display or a GUI is a non-limiting example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are non-limiting examples of user interface components which enable the receiving of information or data from a user. The GUI may include various GUI elements, such as display graphics, buttons, selectable objects, text, video, or the like. In some embodiments, the GUI and/or elements thereof may be overlaid onto video content. For instance, a computer-generated GUI element may be embedded into a broadcast video feed such that a viewer watching the television feed may see the GUI element overlaid on the video presented on a television screen (or video presented via a web-based platform).

An "event" may generally refer to any organized gathering and includes, but is not limited to, a sporting event, a competition, a musical concert, a card tournament, a fishing competition, a race, an awards show, an election, or the like. Illustrative sporting events may include, but are not limited to, a race, a basketball game, a hockey game, a baseball game, a boxing match, a tennis match, a golf tournament, a soccer match, a rugby match, a lacrosse game, a volleyball game, and a cricket match. Illustrative races include, but are not limited to, a motor vehicle race, a bike race, a ski race, a bobsled race, an ice skating race, and a foot race.

The present disclosure relates generally to a computer-driven display of object location and motion information, particularly during an event, before an event, or after an event, particularly events where tracking may be necessary or desired. In some embodiments, the display may be presented in real-time. The systems and methods described herein may be used to display object location and motion information during a live event. In some embodiments, the display may be presented in post-event or pre-event situations. Such systems and methods may generally be configured to track one or more particular objects in space, such as, for example, in relation to a playing field or the like. Such systems and methods may further be configured to use one or more sets of object categorizations and metrics to automatically organize and highlight object tracking data for a user.

For purposes of clarity, the systems and methods described herein are generally described with respect to a sporting event, such as a football game. However, those having ordinary skill in the art will recognize that the systems and methods are applicable to all events, regardless of the type of event.

Object tracking technology within the world of sports is now becoming quite common. This object tracking technology is being used to track various aspects of objects associated with sporting events, such as the location, velocity, and direction of players, referees, the ball, and other physical objects. Depending on the object tracking system used, this tracking data may be sent at a relatively high frequency, thereby resulting in potentially thousands of relevant tracking updates per second. Such tracking data may have the potential to be extremely valuable for a variety of data consumers, including coaches, players, scouts, television commentators, and/or the like. Such systems and methods described herein may be used for the purpose of Internet, broadcast television, and other media platforms to effectively and meaningfully present object tracking data. For example, a television commentator during a football game may use object tracking data to know, at any moment, the number and exact physical location of each tight end, wide receiver, and running back on the field for the offense. Similarly, the commentator could know, at every moment, the number and exact physical location of each lineman, linebacker, cornerback, and safety for the defense.

FIG. 1 depicts an illustrative presentation system according to a first embodiment. As shown in FIG. 1, the presentation system 100 may include one or more server logic devices 110, which may generally include a processor, a non-transitory memory or other storage device for housing programming instructions, data or information regarding one or more applications, and other hardware, including, for example, the central processing unit (CPU) 505, read only memory (ROM) 510, random access memory (RAM) 515, communication ports 540, controller 520, and/or memory device 525 depicted in FIG. 5 and described below in reference thereto.

In some embodiments, the programming instructions may include an event information management application (the "management application") configured to, among other things, receive and analyze event information from various sources using event information analysis rules and to generate GUI elements for presenting the event information. In some embodiments, the information analysis rules may include event-specific information and/or processes configured to provide a framework for analyzing the event information. In some embodiments, the management application may be configured to analyze event information and to generate accurate event activity probabilities. The server logic devices 110 may be in operable communication with client logic devices 105, including, but not limited to, computing devices and content presentation devices.

In some embodiments, the management application may be accessible through various platforms, such as a client application, web-based application, over the Internet, and/or a mobile application (for example, a "mobile app" or "app"). According to some embodiments, the management application may be configured to operate on each client logic device 105 and/or to operate on a server computing device 110 accessible to client logic devices over a network, such as the Internet. All or some of the files, data and/or processes used for generating and/or presenting GUI elements may be stored locally on each client logic device 105 and/or stored in a central location and accessible over a network. In some embodiments, the management application may receive information from one or more object tracking devices and/or sensors. The management application may receive event information and/or processes to generate GUI elements for, among other things, presenting meaningful and relevant event information to viewers and data consumers in an efficient and easily comprehensible manner.

In some embodiments, one or more data stores 115 may be accessible by the client logic devices 105 and/or server logic devices 110. The data stores 115 may include event information, rules, and/or models, including third-party data sources thereof (for instance, information from the Elias Sports Bureau, Inc.). In some embodiments, the event information may include context information, which may include information that provides context to the event information, such as team names, game date and time, player names, positions, jersey numbers, a game identifier, field information, or the like. In some embodiments, the data stores 115 may include information obtained from object tracking devices and/or systems.

Although the one or more data stores 115 are depicted as being separate from the logic devices 105, 110, embodiments are not so limited, as all or some of the one or more data stores may be stored in one or more of the logic devices.

Figure 2:
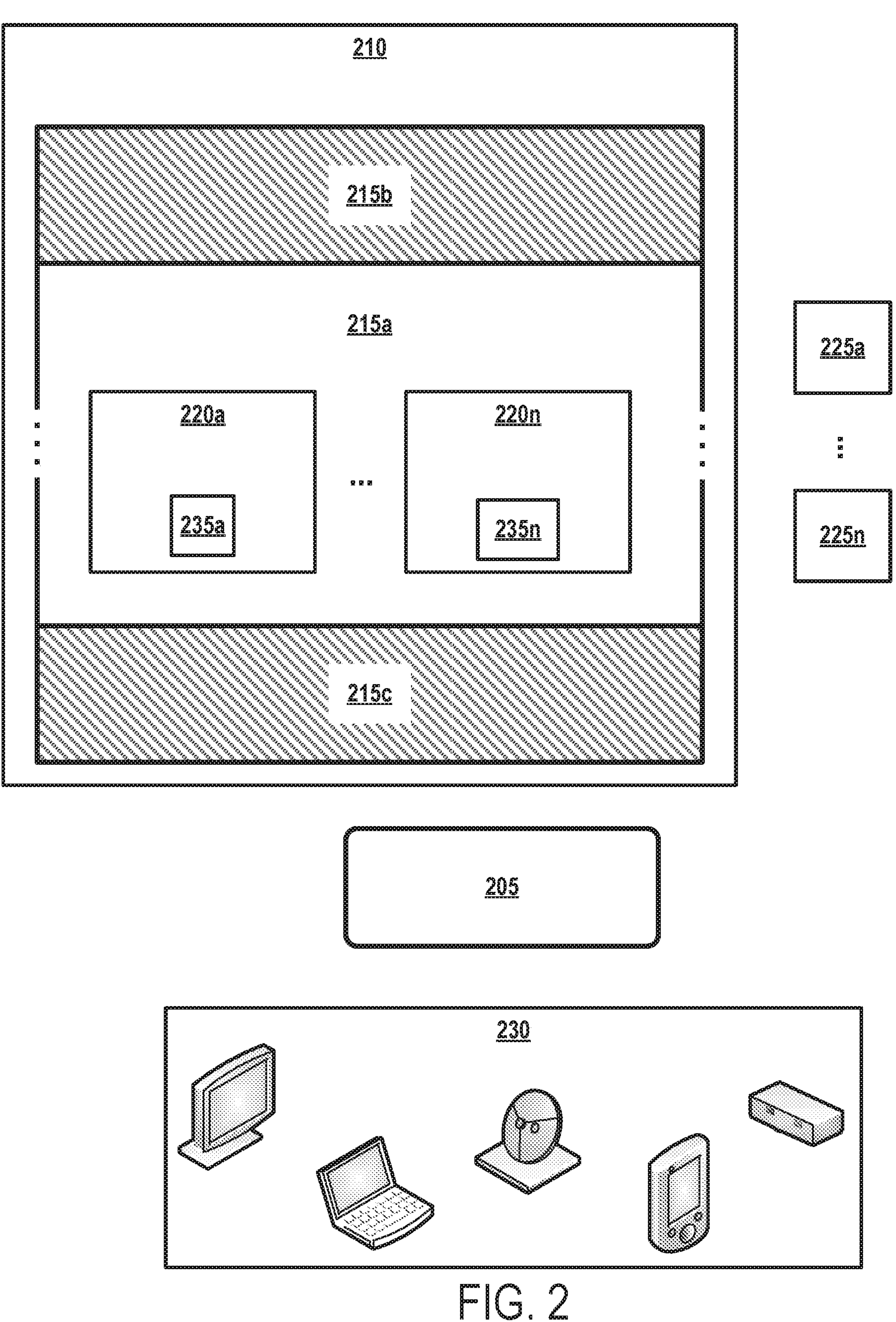
FIG. 2 depicts an illustrative event information presentation system according to a second embodiment.

FIG. 2 depicts an illustrative event information presentation system according to a second embodiment. As shown in FIG. 2, an event area 210 may be defined for an event, such as a sporting event. In the non-limiting example depicted in FIG. 2, the event is a football game, and the event area 210 includes a playing field. The event area 210 may include various segments, landmarks, or the like, including a playing area 215*a* and end zones 215*b,c*. One or more objects 220*a-n* may be located within the event area 210. The objects 220*a-n* may include any object capable of being associated with event information including, without limitation, participants ("players"), equipment (for instance, a football, a baseball, a puck, or the like), or the like. The objects 220*a-n* may be associated with sensors 235*a-n* for tracking, measuring, monitoring, or otherwise obtaining information associated with the object. For instance, a sensor 235*a-n* may obtain physiological, biometric, location, and/or movement information associated with an object 220*a-n*. In some embodiments, the sensors 235*a-n* may be coupled to the object 220*a-n* and/or a portion thereof (for instance, a jersey or helmet of a player). In some embodiments, one or more remote devices 225*a-n* may be arranged in or around the event area 210 to capture event information. In some embodiments, the remote devices 225*a-n* may include cameras, microphones, computing devices (including third-party computing devices and/or databases), or the like. The remote devices 225*a-n* may be configured to obtain event information without being specifically coupled to an object 220*a-n*. In some embodiments, the remote devices 225*a-n* may receive information directly from the sensors 235*a-n*. The event information may be transmitted to the presentation system 205 using the sensors 235*a-n* and/or the remote devices 225*a-n*.

The presentation system 205 may process the event information and generate GUI elements that may be presented on a content presentation device 230. In some embodiments, the presentation system 205 may have access to content presentation information configured to indicate an optimal format for generating the GUI element based on a particular content presentation device and/or presentation application (for instance, web browser, mobile application, or the like). The presentation system 205 may configure the GUI element for optimum presentation on a particular content presentation device and/or presentation application.

Figure 3:
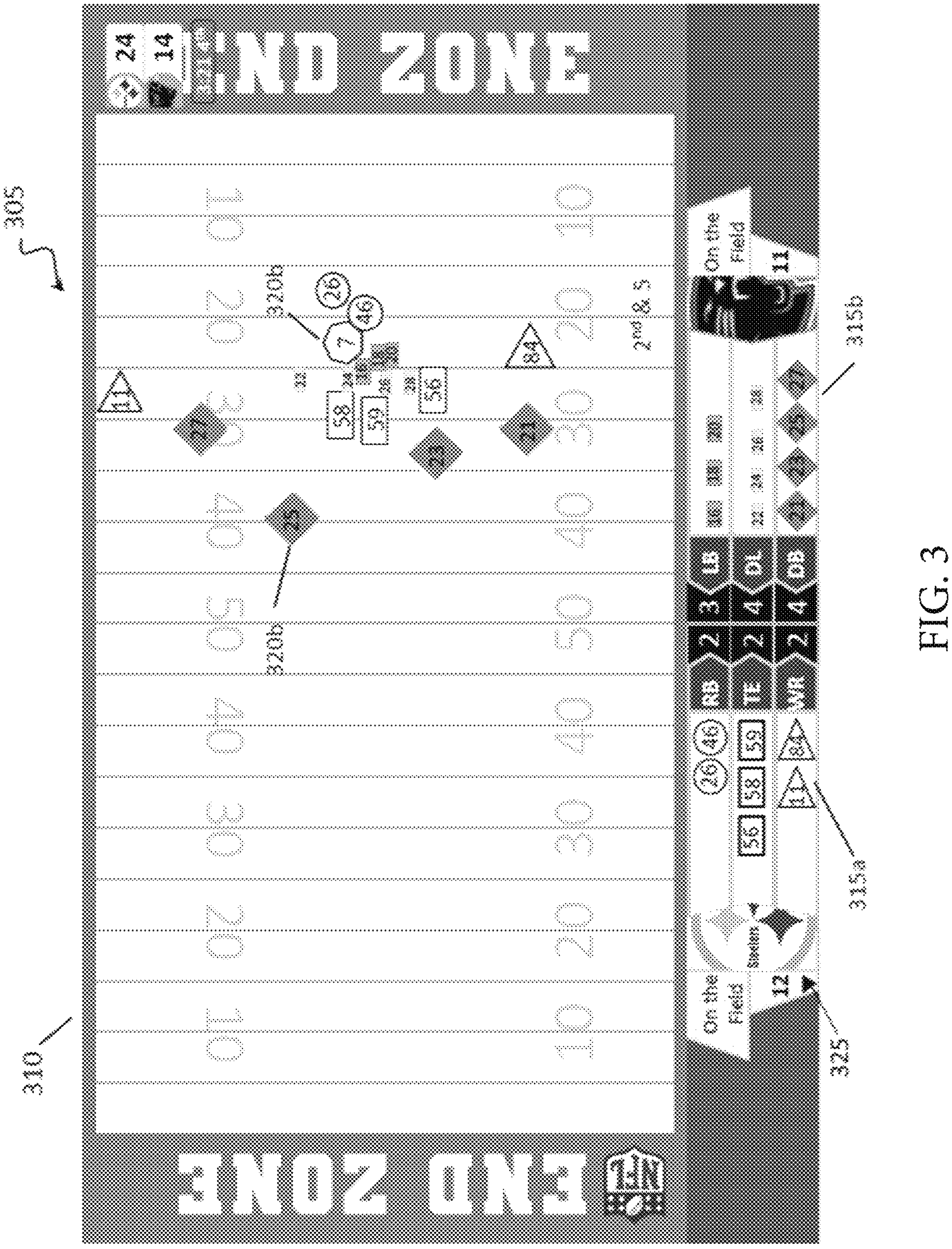
FIG. 3 depicts an illustrative graphical user interface according to an embodiment.

FIG. 3 depicts an illustrative GUI 305 according to an embodiment. As shown in FIG. 3, a GUI 305 may include an event area 310, such as a football field. In other embodiments, the event area 310 includes a basketball court, a hockey rink, a baseball field, a rugby field, a lacrosse field, or any other type of sports arena or event venue. Event information obtained by the presentation system may generate various GUI elements, such as an "on the field" GUI element 315*a,b* which presents information pertaining to the particular players on the field during the current play. The GUI elements may include object GUI elements 315*a,b* configured to present event information and/or context information relating to an object. For instance, an object GUI element 315*a,b* for a football receiver running a route may include running speed, probability of being targeted, probability of catching a pass, historical statistics, or the like. In another instance, an object GUI element 320*a, b* for a baseball player at first base may include lead-off distance, probability of attempting to steal, probability of a successful stealing attempt, historical base running statistics, probability of scoring, or the like. In some embodiments, an object GUI element 320*a,b* may be overlaid onto a video presentation of the event. In some embodiments, the overlaid object GUI element 320*a,b* may be configured to appear to be "attached" to an object, such as a player, a race car, or the like. In some embodiments, the event information may include a location of the object, including a relative location on a display screen, such that the GUI element may be positioned adjacent to the object and/or appear to follow the object. The GUI object is consistent for a single player, position, ball, or the like across all aspects of the GUI. By way of example, a diamond which contains a number 315*b* is used to provide data-based context for a specific player, and the same diamond which contains a number 320*b* is overlaid onto a live video presentation of an event to help the viewer locate the specific athlete or the like on the GUI. The GUI preferably includes two sections, with the first section including a graphical representation of an overhead view of the sports arena and the second section including a graphical representation of the rosters including players from teams currently active in the sports event. The first section of the GUI or first display portion of the display includes the position or approximate position of players from both teams in the sports arena. Preferably, each player is indicated using a shape such as a triangle, diamond, square, circle, pentagon, hexagon, heptagon, octagon, etc. Each shape preferably corresponds to a position of the player on a team roster. Furthermore, each shape is configured to be color coded based on position and/or the team the player is a member of. The size of each shape is also operable to distinguish player positions from other positions on a roster. As illustrated in FIG. 3, running backs for the PITTSBURGH STEELERS are indicated with white circles on the first portion of the GUI, tight ends are represented by white rectangles, and wide receivers are indicated with white triangles. Linebackers for the CAROLINA PANTHERS are represented as dark gray rectangles. The defensive linemen of the CAROLINA PANTHERS are represented by rectangles which are a lighter shade than the shade of the rectangles which represent defensive linemen of the CAROLINA PANTHERS. Finally, defensive backs are represented by gray diamonds for the CAROLINA PANTHERS. In one embodiment, the shapes representing all players on a roster for a team are coded with one color, such as blue for the CAROLINA PANTHERS and yellow for the PITTSBURGH STEELERS. The number associated with each shape preferably corresponds to a jersey number of that player. In another embodiment, defensive positions are associated with one of the team's colors and offensive positions are associated with one of the team's colors, such as blue for offense and black for defense for the CAROLINA PANTHERS. In another embodiment, the outline of the shape on the GUI is color coded for the player's position. Alternatively, the number in each shape corresponds to a position played by that player. For example, positions on a basketball court are often referred to by numbers ranging from one to five, with one being the point guard, two being the shooting guard, three being the small forward, four being the power forward, and five being the center. The position of each player in the sports arena is updated in real time or near real time based on sensor data received from sensors associated with the players, live video analysis of the positions of the players, or any other method of determining position known in the art. By associating each player position with a shape, the first section of the GUI provides more visibility into the events of the games as well as the strategies employed by teams. Notably, the GUI object or shape, such as the single player or position, is consistent across multiple sections of the GUI. The second section of the GUI or second display portion of the display acts as a legend or a guide to the first section of the GUI and includes two halves, with a first half representing one team and a second half representing another team. Each half includes rows, with each row corresponding to a roster position for each team. Each row indicates a position (ex: RB for running back, TE for tight end, WR for wide receiver, LB for linebacker, DL for defensive lineman, and DB for defensive back) as well as the number of players playing that position currently on the field. Each row also includes the graphical representations of the players for that position. For example, players with jersey numbers of 26 and 46 are running backs (RBs), players with jersey numbers of 56, 58, and 59 are tight ends (TEs), and players with jersey numbers of 11 and 84 are wide receivers (WRs) for the PITTSBURGH STEELERS. Players with jersey numbers of 16, 18, and 20 are linebackers (LBs), players with jersey numbers of 22, 24, 26, and 28 are defensive linemen (DLs), and players with jersey numbers of 21, 23, 25, and 27 are defensive backs (DBs) for the CAROLINA PANTHERS. A total number of players for each team on the field is also indicated; the PITTSBURGH STEELERS currently have 12 players on the field and the CAROLINA PANTHERS currently have 11 players on the field. Additional players for the PITTSBURGH STEELERS are viewable through activation of a down arrow 325 in one embodiment. Alternatively, additional players for the PITTSBURGH STEELERS are automatically displayed via the GUI automatically rotating through the rows associated with the positions on the GUI.

Figure 4:
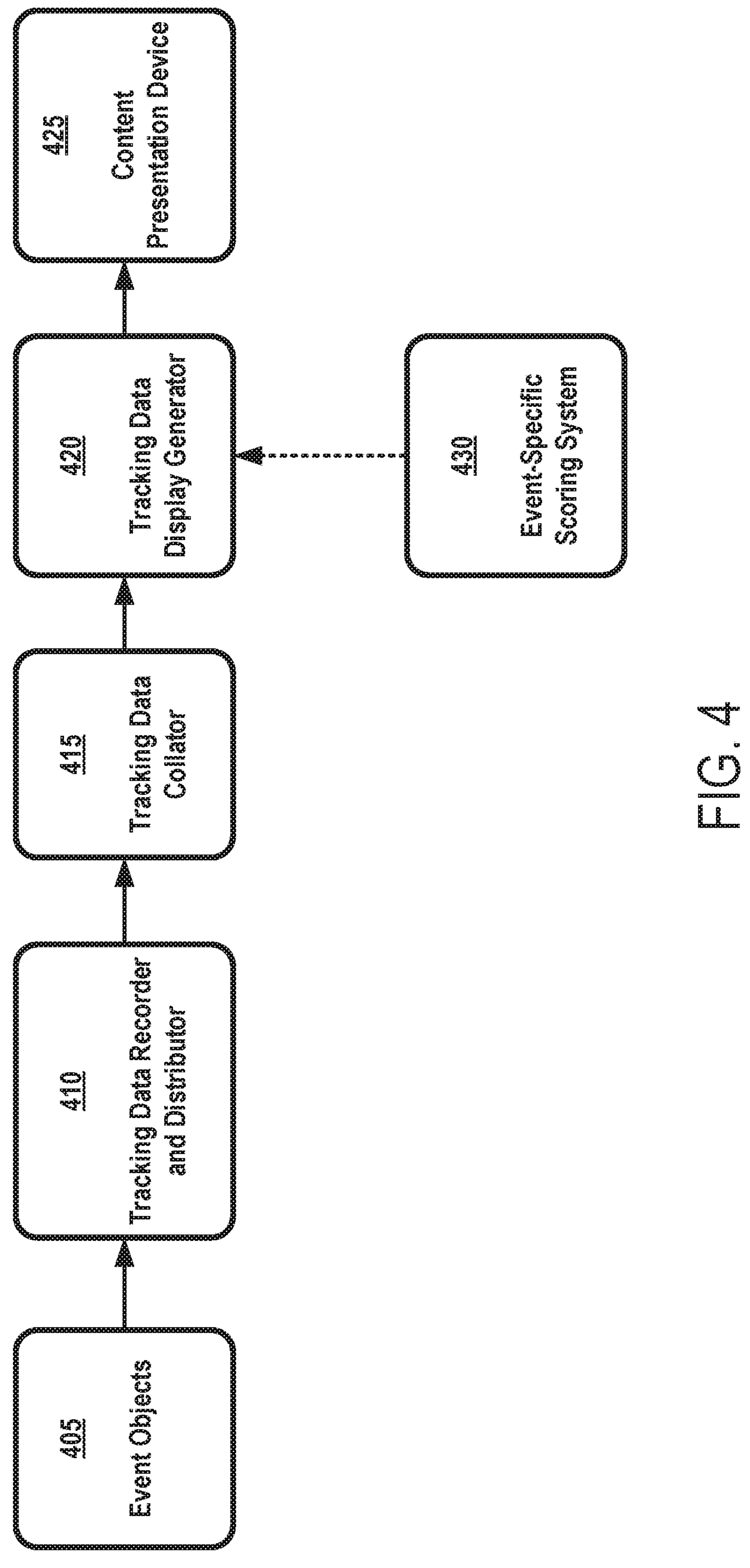
FIG. 4 depicts an illustrative information flow pathway according to an embodiment.

FIG. 4 depicts an illustrative information flow pathway according to an embodiment. As shown in FIG. 4, a tracking data recorder and distributor 410 may obtain data from event objects 405 according to some embodiments. A tracking data collator 415 may generally be configured to collate data as it is received from one or more sources, such as, for example, the tracking data recorder and distributor 410. Thus, the tracking data collator 415 may take raw data obtained from one or more sources and instantly perform calculations to obtain data that may be usable to one or more users. The tracking data display generator 420 may generate display information for one or more users based on the data obtained, generated, collated, and/or the like by the tracking data collator 415, as described in greater detail herein. Such information may be provided to a user via a content presentation device. In some embodiments, the information may be provided in real-time or substantially real-time. For example, after a particular play in a sporting event, the tracking data collator 415 may obtain data from the tracking data recorder and distributor 410 and/or other devices, generate user-friendly information, and transmit the user-friendly information to the tracking data display generator 420 in a short time frame after the raw data was obtained. For example, in some embodiments, the various processes herein may be completed so that the information is displayed on a display within about 1 second to about 60 seconds after the raw data was recorded or obtained.

The event information that is tracked, obtained, generated, and/or the like by the tracking data recorder and distributor 410 and further collated by the tracking data collator 415 is not limited by this disclosure, and can generally be any data that is obtained and/or generated relating to a live event. For example, event information relating to a football game may include, but is not limited to, player information, game official (referee) information, ball information, penalty and challenge flag information, line of scrimmage information, first down information, drive number, possessing team, ball position on the field, down, distance to a first down, distance to the goal line, distance to field goal range, play clock time remaining, game clock time remaining, quarter information, yards gained or lost on the previous play, total yards gained or lost, whether a first down was earned, turnover information, stopped clock information, team score, player names, player numbers, player positions, number of players that are currently active for a team, players that are on a non-playing list such as an injured list, a physically unable to perform list, a commissioner's exemption list, a suspension list, number of players on the field of play, positions of players on the field of play, number of eligible receivers on the field of play, play formation, receiver formation, backfield formation, quarterback formation, defensive line formation, defensive linebacker formation, defensive coverage formation, type of play, a particular player's offensive activity, a particular player's defensive activity, a player's likelihood of success with a particular activity, location data, velocity data, and acceleration data.

In some embodiments, the event information may be derived from the location, velocity, acceleration, and/or directional data obtained from each tracked object. For example, the football itself may be tracked throughout the course of a football game, either by visual tracking or by electronic means, such as via a global positioning satellite (GPS) device, a near field communication (NFC) device, radio-frequency identification (RFID) device, or other tracking device located within the football. Thus, each time the football is moved, such as via a pass play, a running play, a special teams play, movement by game officials, and/or the like, event information relating thereto may be generated and tracked. The data may further include a specific location of the football with respect to the playing field, for example, a specific yard line where the ball is located.

In some embodiments, the event information may be derived from tracking statistics that have accumulated from the history of location, velocity, acceleration, and/or directional data related to each tracked object. Thus, for example, the location history of the football for a particular game, range of games, and/or the like may be tracked. The location history may further be tracked for each team, for each division, for each conference, for an entire league, and/or the like.

In some embodiments, the event information may be derived from relationships between various tracked objects and biological/roster position data (e.g., quarterback, running back, or the like), such as data that is provided by an event-specific scoring system 430. The event-specific scoring system 430 may provide a framework of rules for evaluating the event information. For example, a football-specific scoring system may interpret the event information according to the rules, playing field dimension, historical information, relevant statistics, or the like associated with the sport of football. For instance, the speed of the football passed by a quarterback is not traditionally a relevant statistic in football. However, the speed of a baseball being thrown by a pitcher during an at-bat is a relevant and meaningful statistic in the game of baseball. In another example, the location of the football may be tracked relative to one or more particular players on the field of play. Thus, for example, a pass from a quarterback to a tight end can be detected by tracking the location of the football with respect to the location of the quarterback as he passes the football and the tight end as he catches the ball once it has been thrown by the quarterback. For instance, a pass may be detected based on the location of the ball in space (for instance, distance relative to the playing surface) and/or the speed of travel of the ball (for example, in comparison to the speed of travel during a rushing play).

In some embodiments, the data may be derived from relationships between various tracked object and scoring data, such as scoring data provided by an event-specific scoring system 430. The scoring data may include, without limitation, a play log, a sporting event context, and/or accumulated statistical data. In some embodiments, the scoring data may be synchronized with the event information, such as object tracking data. Such synchronization may allow for the data to be tracked and/or recorded more efficiently on the same timeline, thereby maintaining chronological order.

Other objects that may be tracked during a football game (other than the football) may include, but are not limited to, the players, the game officials, penalty flags, challenge flags, a line of scrimmage indicator, a first down indicator, a goal line boundary indicator, and/or the like.

In various embodiments, particular details with respect to the progress of the live event may be tracked. In some embodiments, the particular details may be used to provide context for the location data and relationship data between objects, as described hereinabove. Such context may allow for the event information to be more fully understood and may prevent data from being misinterpreted, skewed, and/or the like. Illustrative particular details may include a timestamp, a result of a play from scrimmage that occurred during the game, the drive number, the possessing team, the ball position on the field, the down, the distance, the play clock time, the game clock, and/or the like. In some embodiments, such particular details may be combined with accumulated statistical data, such as accumulated official statistics and accumulated unofficial statistics for teams and for all players on the team.

Once the event information is generated, tracked, obtained, and collated, it may be displayed on a display of a content presentation device 425 via the tracking data display generator 420. The display of the content presentation device 425 can display the data in any format, particularly formats that are easy to be read and understood by an average user. Event information may be displayed in various formats, differentially selected based on the type of information. For instance, the event information may be presented in the form of a game clock time, a quarter, a visiting team score, a home team score, the number of players active on the field for each team, and players classified by roster position. Some event information may be provided in the form of a graphical overlay, such as tracking data statistics and scoring data statistics. For example, an overlay GUI element may include a completion percentage for a particular quarterback by showing the number of completed passes versus the number of attempted passes, the total amount of yards thrown, the average number of yards per pass, the number of touchdowns thrown, the number of interceptions thrown, and/or a quarterback rating.

The GUI element may further indicate to a user various other details based on the obtained event information, such as, for example, the name of the offensive receiver formation (for instance, spread, slot left, slot right, or the like), the name of the offensive backfield formation (for instance, single set, pro set, single wing, wildcat, pistol, or the like), the name of the offensive quarterback formation (for instance, under center, shotgun, wide, or the like), the name of the defensive line-linebacker formation (for instance, 4-3, 3-4, 5-2, or the like), and the name of the defensive coverage formation (for instance, nickel, dime, prevent, or the like). Such formations may generally be determined by the tracking data collator by determining object locations with relation to the playing field and each other, as described in greater detail herein.

The GUI element may further be configured to indicate various probabilities that have been calculated based on the obtained event information. For example, in some embodiments, the GUI element may indicate a head-to-head probability of success for the offense on a particular play, the probability of success for the offense on a particular play, the probability of success of a particular player making a particular play, and/or the like. The probability may be based on the current player personnel on the field, the formation each team has assumed, and/or the like.

In addition to the foregoing, in some embodiments, the GUI element may also present additional items such as one or more views of the football field, a line of scrimmage drawn in a correct position relative to the football field, a first down line drawn in a correct position relative to the football field, and/or the like. In some embodiments, the GUI element may provide distinct indicators for each participant, such as, for example, a symbol for each player that is based upon the player's roster position, the player's number, the player's name, and/or the like. In some embodiments, the symbol is a specific shape (for instance, based on position, team, being a referee, status, popularity, being on a viewer's fantasy team, or the like). By way of example, as a seen in FIG. 3, running back (RB) is designated with a circle, a tight end (TE) is designated with a triangle pointing to the right, and a defensive back (DB) is designated with a diamond. More generally, a specific shape or symbol is used for a player based on the roster position of that player or whether that player is currently an offensive or defensive player. In some embodiments, the symbol may be color-coded (for instance, based on position, team, status, popularity, being on a viewer's fantasy team, or the like), contain special characters, numbers, and/or the like. In some embodiments, the display may indicate portions of the playing field in a particular color, such as, for example, the offensive side of the ball in one color and the defensive side of the ball in a second color. This may be determined based on historical information, an event-specific scoring system, tracking data, or other methods. In another embodiment, players are assigned a color based on their roster position. The difference in color is in the GUI element itself or in an outline of the GUI element. By way of example, as seen in FIG. 3, the GUI element for the offensive player has no colored outline (such as the rectangle used to designated the tight ends), and the GUI element for the defensive player has a colored outline which is darker than the fill color of the GUI element itself (such as the rectangles used to designate the linebackers (LB) and defensive lineman (DL)). These different colors and shapes assigned to different positions and the like are naturally applicable to other sports.

Figure 5:
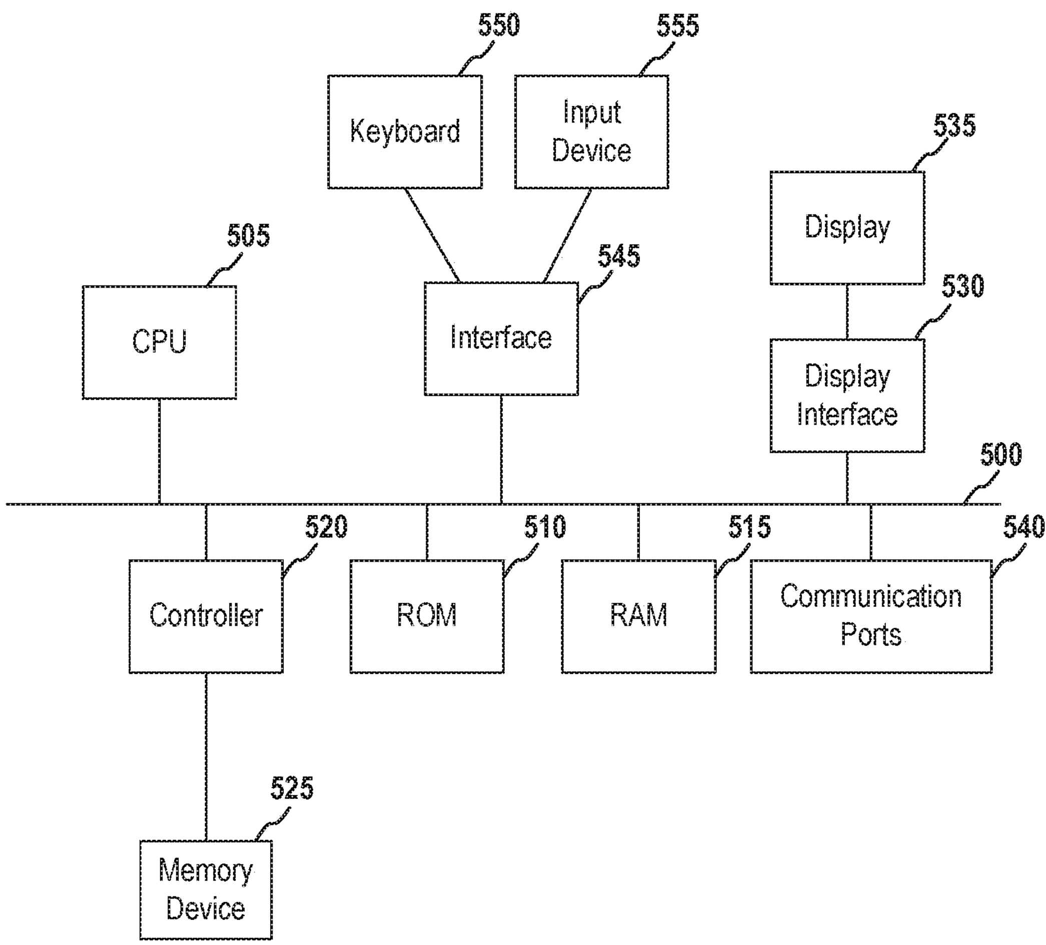
FIG. 5 depicts a block diagram of an illustrative computing device according to an embodiment.

Processes for obtaining, processing, and providing data may include one or more procedures that are completed by a processing device, such as the CPU 505 described herein with respect to FIG. 5. As also described with respect to FIG. 5, such a processing device may be operably connected to one or more other devices that are also configured to complete one or more processes at the direction of the processing device. For example, a process may include obtaining and recording raw data for use as described herein. The raw data may generally be obtained by one or more sensors or remote devices (for instance, a camera). For example, a sensor may be placed in objects relating to the live event for tracking movement, biometric information, physiological information, location information, and/or the like, as described in greater detail herein. The raw data may be recorded in a non-transitory, computer-readable storage medium. The processing device may obtain the data and transform the data into information that is usable by a user. The processing device may direct a display to display the information to the user in the form of a GUI element. In some embodiments, the processing device may receive one or more inputs from the user via the display or an input device and may transform additional data into information that is usable by the user based on the one or more inputs.

FIG. 5 depicts a block diagram of exemplary internal hardware that may be used to contain or implement the various computer processes and systems as discussed above. A bus 500 serves as the main information highway interconnecting the other illustrated components of the hardware. CPU 505 is the central processing unit of the system, performing calculations and logic operations required to execute a program. CPU 505 is an exemplary processing device, computing device or processor as such terms are used within this disclosure. Read only memory (ROM) 530 and random access memory (RAM) 535 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps described above may be stored in the ROM 530 and/or the RAM 535. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or a local area network.

The hardware may also include an interface 545 which allows for receipt of data from input devices such as a keyboard 550 or other input device 555 such as a mouse, a joystick, a touch screen, a remote control, a pointing device, a video input device and/or an audio input device.

The computing device of FIG. 5 and/or components thereof may be used to carry out the various processes as described herein.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for event information presentation, comprising:

a processor and a non-transitory computer-readable storage medium in communication with the processor, wherein the non-transitory computer-readable storage medium contains one or more programming instructions;

wherein the processor is configured to populate a display of a graphical user interface (GUI) of a content presentation device with graphical elements associated with live event objects active in a live event and overlay the graphical elements with distinct indicators for each player onto video content, wherein the display is populated based on location information of the live event objects with object tracking data in real-time;

wherein the display includes a digital representation of a venue associated with the live event on a first display portion of the GUI;

wherein the graphical elements associated with the live event objects include a plurality of sets of graphical elements for each of a first team and a second team;

wherein the display includes a legend on a second display portion of the GUI that presents a roster of the live event objects currently active in the live event, wherein the legend includes the plurality of sets of graphical elements presented in the digital representation of the venue, and wherein the legend includes rows with each row corresponding to a single roster position for each team; and wherein the graphical elements in the legend comprise distinct indicators for each player using different symbols and shapes with different colors based on a roster position of the player on a field of the live event and matched with the distinct indicator for each player overlayed on the video content of the live event within the graphical user interface.

2. The system of claim 1, wherein the processor automatically determines a likelihood of success for the first team and/or the second team on a particular play.

3. The system of claim 1, wherein the object tracking data is generated by at least one sensor attached to a player or game object, and/or by at least one remote device capturing an audio and/or a visual state of players and/or game objects in the live event.

4. The system of claim 3, wherein the at least one remote device includes at least one microphone and/or at least one camera.

5. The system of claim 1, wherein the GUI comprises a multiplicity of GUI elements including display graphics, buttons, selectable objects, text, and/or videos, and wherein the multiplicity of GUI elements are operable to be overlaid onto video content.

6. The system of claim 1, wherein the processor is further configured to update locations of the plurality of sets of graphical elements on the display in real time or near real time based on updated location information of the live event objects.

7. The system of claim 1, wherein the processor is further configured to update locations of the plurality of sets of graphical elements concurrently with a live broadcast of the live event.

8. The system of claim 1, wherein the non-transitory computer-readable storage medium further contains one or more programming instructions that, when executed, cause the processor to generate at least one event-specific prediction based on event information and event-specific rules, wherein the event information comprises historical information associated with the event objects.

9. A method for event information presentation, comprising:

populating a display of a graphical user interface (GUI) of a content presentation device with graphical elements associated with live event objects active in a live event and overlaying the graphical elements with distinct indicators for each player onto video content, wherein the display is populated based on location information of the live event objects with object tracking data in real-time;

wherein the display includes a digital representation of a venue associated with the live event on a first display portion of the GUI;

wherein the graphical elements associated with the live event objects include a plurality of sets of graphical elements for each of a first team and a second team;

wherein the display includes a legend on a second display portion of the GUI that presents a roster of the live event objects currently active in the live event, the legend includes the plurality of sets of graphical elements presented in the digital representation of the venue, and wherein the legend includes rows with each row corresponding to a single roster position for each team; and wherein the graphical elements in the legend comprise distinct indicators for each player using different symbols and shapes with different colors based on a roster position of the player on a field of the live event and matched with the distinct indicator for each player overlayed on the video content of the live event within the graphical user interface.

10. The method of claim 9, further comprising the processor automatically determining a likelihood of success for the first team and/or the second team on a particular play.

11. The method of claim 9, wherein the object tracking data is generated by at least one sensor attached to a player or game object, and/or by at least one remote device capturing an audio and/or a visual state of players and/or game objects in the live event.

12. The method of claim 11, wherein the at least one remote device includes at least one microphone and/or at least one camera.

13. The method of claim 9, further comprising overlaying a multiplicity of GUI elements onto video content, wherein the multiplicity of GUI elements includes display graphics, buttons, selectable objects, text, and/or videos.

14. The method of claim 9, further comprising updating locations of the plurality of sets of graphical elements on the display in real time or near real time based on updated location information of the live event objects.

15. The method of claim 9, further comprising updating locations of the plurality of sets of graphical elements concurrently with a live broadcast of the live event.

16. The method of claim 9, further comprising generating at least one event-specific prediction based on event information and event-specific rules, wherein the event information comprises historical information associated with the event objects.

17. A system for event information presentation, comprising:

a processor and a non-transitory computer-readable storage medium in communication with the processor, wherein the non-transitory computer-readable storage medium contains one or more programming instructions;

wherein the processor is configured to populate a display of a graphical user interface (GUI) of a content presentation device with graphical elements associated with live event objects active in a live event and overlay the graphical elements with distinct indicators for each player onto video content, wherein the display is populated based on location information of the live event objects with object tracking data;

wherein the display includes a digital representation of a venue associated with the live event on a first display portion of the GUI;

wherein the graphical elements associated with the live event objects include a plurality of sets of graphical elements for each of a first team and a second team;

wherein the display includes a legend on a second display portion of the GUI that presents a roster of the live event objects currently active in the live event, wherein the legend includes the plurality of sets of graphical elements presented in the digital representation of the venue, and wherein the legend includes rows with each row corresponding to a single roster position for each team; and wherein the graphical elements in the legend comprise distinct indicators for each player using different symbols and shapes with different colors based on a roster position of the player on a field of the live event and matched with the distinct indicator for each player overlayed on the video content of the live event within the graphical user interface.

18. The system of claim 17, wherein the processor automatically determines a likelihood of success for the first team and/or the second team on a particular play.

19. The system of claim 17, wherein the object tracking data is generated by at least one sensor attached to a player or game object, and/or by at least one remote device capturing an audio and/or a visual state of players and/or game objects in the live event.

20. The system of claim 19, wherein the at least one remote device includes at least one microphone and/or at least one camera.

* * * * *